(12) United States Patent
Lee et al.

(10) Patent No.: US 9,019,446 B2
(45) Date of Patent: Apr. 28, 2015

(54) LIQUID CRYSTAL DISPLAY DEVICE AND MANUFACTURING METHOD THEREOF

(75) Inventors: Burm-Young Lee, Chungcheongham-do (KR); Soon-Bum Kwon, Chungcheongnam-do (KR); Seo-Kyu Park, Chungcheongnam-do (KR); Hee-Suck Cho, Chungcheongnam-do (KR); Ji-Hoon Lee, Chungcheongnam-do (KR)

(73) Assignee: NDIS Corporation, Chungcheongnam-Do (KR)

( * ) Notice: Subject to any disclaimer, the term of this patent is extended or adjusted under 35 U.S.C. 154(b) by 297 days.

(21) Appl. No.: 13/517,273

(22) PCT Filed: Nov. 16, 2010

(86) PCT No.: PCT/KR2010/008102
§ 371 (c)(1),
(2), (4) Date: Jun. 20, 2012

(87) PCT Pub. No.: WO2011/078480
PCT Pub. Date: Jun. 30, 2011

(65) Prior Publication Data
US 2012/0274883 A1 Nov. 1, 2012

(30) Foreign Application Priority Data
Dec. 21, 2009 (KR) .................. 10-2009-0128278

(51) Int. Cl.
*G02F 1/1333* (2006.01)
*G02F 1/13* (2006.01)
*G02F 1/137* (2006.01)

(52) U.S. Cl.
CPC ...... *G02F 1/13718* (2013.01); *G02F 1/133377* (2013.01); *G02F 2203/34* (2013.01)

(58) Field of Classification Search
CPC .......................... G02F 1/13718; G02F 1/1334
USPC ....................................... 349/88–92, 175, 187
See application file for complete search history.

(56) References Cited

U.S. PATENT DOCUMENTS

| | | | |
|---|---|---|---|
| 6,331,881 B1 * | 12/2001 | Hatano et al. | 349/86 |
| 6,645,397 B2 * | 11/2003 | Ichihashi | 252/299.61 |
| 6,864,931 B1 * | 3/2005 | Kumar et al. | 349/88 |
| 8,456,594 B2 * | 6/2013 | Jang et al. | 349/86 |

FOREIGN PATENT DOCUMENTS

| | | |
|---|---|---|
| JP | 2000-267063 | 9/2000 |
| JP | 2001-209073 | 8/2001 |
| KR | 1020020000725 | 1/2002 |
| KR | 1020080017012 | 2/2008 |

* cited by examiner

*Primary Examiner* — Dung Nguyen
(74) *Attorney, Agent, or Firm* — Stuart H. Mayer; Mayer & Williams PC

(57) ABSTRACT

A method for manufacturing a liquid crystal display device including first, second, and third pixels for displaying different colors comprises the steps of: forming a first electrode on a substrate; forming a liquid crystal layer including a cholesteric liquid crystal as a mixed material of a non-polymeric liquid crystal compound and a photosensitive chiral additive; irradiating a different intensity of light on the liquid crystal layer positioned on the first pixel, the liquid crystal layer positioned on the second pixel, and the liquid crystal layer positioned on the third pixel; and forming a second electrode facing the first electrode.

10 Claims, 9 Drawing Sheets

LIQUID CRYSTAL DISPLAY DEVICE AND MANUFACTURING METHOD THEREOF

TECHNICAL FIELD

The present invention relates to a liquid crystal display (LCD) device and a manufacturing method thereof.

BACKGROUND ART

A liquid crystal display (LCD) device is one of flat panel display devices that are currently used a lot. An LCD device includes electric field generating electrodes and a liquid crystal layer, and generates an electric field on the liquid crystal layer by applying a voltage to the electric field generating electrodes, thereby determining the direction of liquid crystal molecules of the liquid crystal layer and adjusting the transmittance of light that passes through the liquid crystal layer.

In order to display colors, an LCD device includes color filters. The color filters may include red, green, and blue filters and may be formed on every pixel to display colors by controlling the intensity of light that passes through each pixel. Colors may be combined to display full colors.

Color filters may be formed by using a lithography process including coating, exposing, and developing processes, or an inkjet printing method for injecting liquid ink onto predetermined regions defined by barriers. However, color filters may require high costs and may reduce light transmittance.

Currently, research is being conducted on methods of displaying colors without using color filters. One of those methods is a method using cholesteric liquid crystals. Since cholesteric liquid crystals have liquid crystal molecules that are oriented in a helical structure and reflects light of a certain wavelength according to a pitch of the helical structure, predetermined colors may be displayed by adjusting the pitch.

However, since cholesteric liquid crystals exist in a fluid phase, in order to allow the cholesteric liquid crystals to have different pitches between different pixels, red, green, and blue panels should be independently formed and stacked, or an additional structure for separating the cholesteric liquid crystals is required. In this case, processes may be complicated, manufacturing costs may be increased, and the resolution of a panel may be restrictive.

DETAILED DESCRIPTION OF THE INVENTION

Technical Problem

The present invention provides a method of manufacturing a liquid crystal display (LCD) device capable of displaying colors without using color filters by forming cholesteric liquid crystals having different pitches at different pixels.

The present invention also provides an LCD device manufactured by using the above method.

Technical Solution

According to an aspect of the present invention, there is provided a method of manufacturing a liquid crystal display (LCD) device including first through third pixels for displaying different colors, the method including forming a first electrode on a substrate; forming on the first electrode a liquid crystal layer including cholesteric liquid crystals formed by mixing a non-polymerizable liquid crystal compound and a photosensitive chiral additive; irradiating different intensities of light onto the liquid crystal layer located on the first pixel, the liquid crystal layer located on the second pixel, and the liquid crystal layer located on the third pixel; and forming a second electrode facing the first electrode.

The method may further include, before the liquid crystal layer is formed, encapsulating the cholesteric liquid crystals.

The encapsulating of the cholesteric liquid crystals may be performed by using an emulsification method, a coacervation method, or a membrane separation method.

The encapsulating of the cholesteric liquid crystals may include dispersing the non-polymerizable liquid crystal compound and the photosensitive chiral additive in a solution; and adding a hardener into the solution.

The method may further include, after the cholesteric liquid crystals are encapsulated, mixing the encapsulated cholesteric liquid crystals with a binder.

The first pixel may display a color having a longer wavelength region than that of a color displayed by the second pixel, and the second pixel may display a color having a longer wavelength region than that of a color displayed by the third pixel.

The irradiating of different intensities of light onto the liquid crystal layer located on the first pixel, the liquid crystal layer located on the second pixel, and the liquid crystal layer located on the third pixel may be performed by using a mask having a light-transmitting region and a light-blocking region, and may include disposing the light-transmitting region of the mask on the first pixel and irradiating light having a first intensity; disposing the light-transmitting region of the mask on the second pixel and irradiating light having a second intensity; and disposing the light-transmitting region of the mask on the third pixel and irradiating light having a third intensity, and the first intensity may be greater than the second intensity and the second intensity may be greater than the third intensity.

The first through third pixels may respectively display red, green, and blue.

The photosensitive chiral additive may include a photo-isomerizable chiral additive, a photo-polymerizable chiral additive, a photo-decomposable chiral additive, or a combination thereof.

The method may further include forming a light absorbing layer on one surface of the liquid crystal layer.

According to an aspect of the present invention, there is provided a liquid crystal display (LCD) device including first through third pixels for displaying different colors; a pair of electric field generating electrodes facing each other; a liquid crystal layer disposed between the pair of electric field generating electrodes; and a light absorbing layer disposed on one surface of the liquid crystal layer, wherein the liquid crystal layer includes cholesteric liquid crystals having different pitches through the first through third pixels.

The cholesteric liquid crystals may include a non-photosensitive liquid crystal compound.

The cholesteric liquid crystals of the first pixel may have a longer pitch that that of the cholesteric liquid crystals of the second pixel, and the cholesteric liquid crystals of the second pixel may have a longer pitch that that of the cholesteric liquid crystals of the third pixel.

The first through third pixels may respectively display red, green, and blue.

Advantageous Effects

Processes may be simplified and colors may be displayed without using color filters.

BEST MODE

Figure 1:
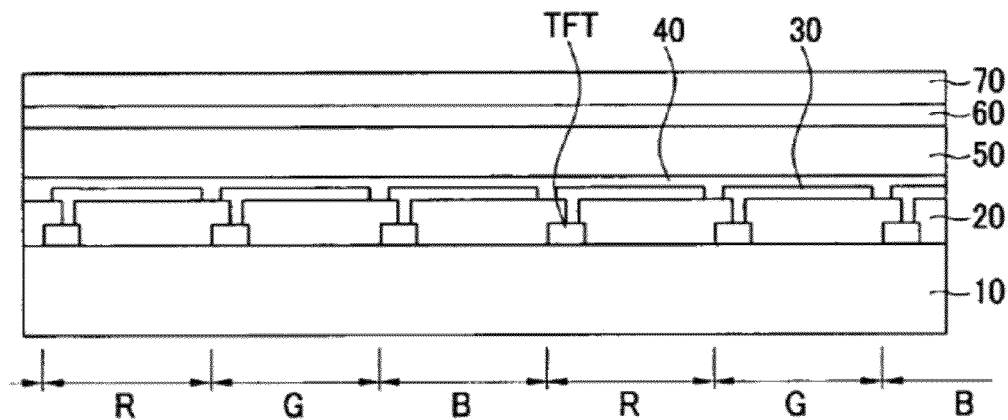
FIG. 1 is a cross-sectional diagram of a liquid crystal display (LCD) device according to an embodiment of the present invention.

Hereinafter, the present invention will be described in detail by explaining embodiments of the invention with reference to the attached drawings such that the technical features of the present invention can be implemented by one of ordinary skill in the art. However, the present invention can be implemented in various forms and is not limited to the embodiments described below.

In the drawings, the thicknesses of layers and regions are exaggerated for clarity. Like reference numerals refer to like elements throughout. When an element, such as a layer, a region, or a substrate, is referred to as being "on" another element, it may be "directly on" the other element or intervening elements may be present. In contrast, when an element is referred to as being "directly on" another element, there are no intervening elements present.

Initially, a liquid crystal display (LCD) device according to an embodiment of the present invention will be described with reference to FIG. 1.

FIG. 1 is a cross-sectional diagram of an LCD device according to an embodiment of the present invention.

The LCD device may include a plurality of pixels for displaying different colors. For example, a red pixel R for displaying red, a green pixel G for displaying green, and a blue pixel B for displaying blue may be alternately disposed. As basic pixels for displaying full colors, the red, green, and blue pixels R, G, and B may form a group and may be repeated in rows and/or columns. However, the positions of pixels may be variously changed.

The LCD device is formed as a single panel in which a plurality of layers are stacked on a substrate 10.

The substrate 10 may be a glass, polymer, or silicon wafer. If the substrate 10 is formed of polymer, a flexible display device may be realized. In this case, the polymer may be one or more selected from the group consisting of, for example, polyacrylate, polyethylene ether phthalate, polyethylene naphthalate, polycarbonate, polyarylate, polyetherimide, polyethersulfone, and polyimide.

A plurality of thin film transistors (TFTs) are formed on the substrate 10. Although FIG. 1 shows that a pixel includes only one TFT, the present embodiment is not limited thereto and each pixel may include two or more TFTs. Here, a TFT may be a switching device. In other embodiments, the LCD device may be manufactured not to include a switching device like TFTs, or may be constructed in the form of a segment.

An insulating layer 20 is formed on the TFTs and a plurality of contact holes for exposing the TFTs are formed in the insulating layer 20.

A plurality of pixel electrodes 30 are formed on the insulating layer 20 and are electrically connected to the TFTs through the contact holes. A lower orientation layer 40 is formed on the pixel electrodes 30. The lower orientation layer 40 may control initial orientation of liquid crystals and may be omitted in some cases.

A liquid crystal layer 50 is formed on the lower orientation layer 40.

The liquid crystal layer 50 includes cholesteric liquid crystals.

The cholesteric liquid crystals may be obtained by mixing and encapsulating a nematic liquid crystal compound and a photosensitive chiral additive.

The nematic liquid crystal compound is a non-photosensitive liquid crystal compound that is not polymerized or decomposed by light. Therefore, as will be described below, even when light is irradiated, the nematic liquid crystal compound may not be polymerized or decomposed, may be maintained in the form of a monomer, and may be oriented in a certain direction due to, for example, application of a voltage.

The photosensitive chiral additive is a compound that reacts by light so as to have chiral properties and may be a photo-polymerizable chiral additive that can be polymerized by light, a photo-decomposable chiral additive that can be decomposed by light, a photo-isomerizable chiral additive that can be isomerized by light, or a combination thereof.

When light is absorbed, helical twisting power (HTP) of molecules of the photosensitive chiral additive may be changed. For example, in a photo-isomerizable chiral additive, when light is absorbed, isomerization occurs from a trans structure to a cis structure or vice versa and thus HTP may be reduced or increased.

Examples of the photo-isomerizable chiral additive include, but are not limited to, compounds represented by Chemical Formulae 1 through 4.

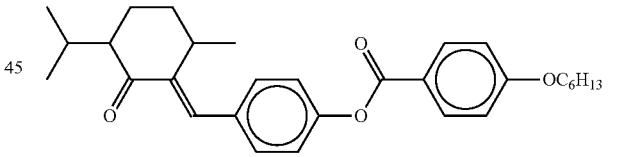

(1)

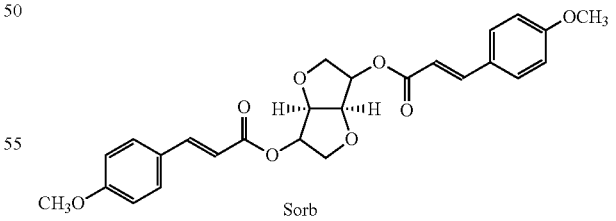

(2)

Sorb

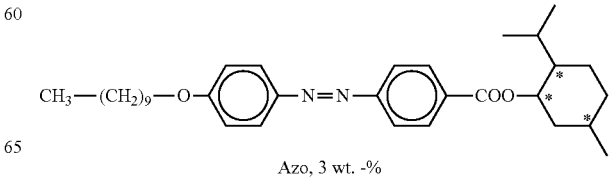

(3)

Azo, 3 wt. -%

-continued

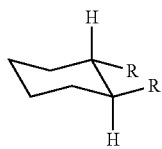

(4)

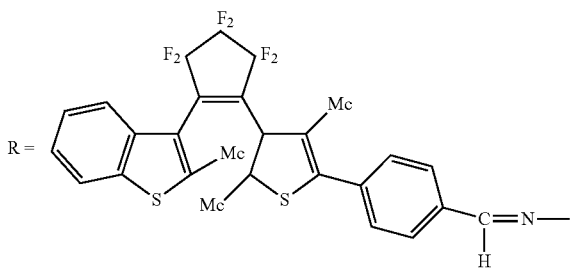

The amount of reduction or increase in HTP may be adjusted based on the intensity of irradiated light. In general, if the intensity of irradiated light is increased, HTP is reduced. Therefore, HTP may be controlled by adjusting the intensity of light.

The nematic liquid crystal compound and the photosensitive chiral additive are mixed to form the cholesteric liquid crystals, and the cholesteric liquid crystals may be oriented in a helical structure in which directors rotate in a helical shape. In this case, if a cycle of the helical shape is referred to as a pitch, the pitch of liquid crystals may be adjusted by HTP.

When light is irradiated onto the cholesteric liquid crystals, a wavelength region of reflected light may be adjusted according to the pitch. Correlations between the pitch and the wavelength region of reflected light may be represented by the following relational expression.

$$n_o p < \lambda < n_e p$$ [Relational Expression]

Here, $n_o$ is an ordinary refractive index of liquid crystals and $n_e$ is an extraordinary refractive index of liquid crystals.

According to the above relational expression, if a pitch p is increased, a wavelength region of reflected light is also increased. If the pitch p is reduced, the wavelength region of reflected light is also reduced.

The above-described explanation will now be described in detail with reference to FIG. 2.

Figure 2:
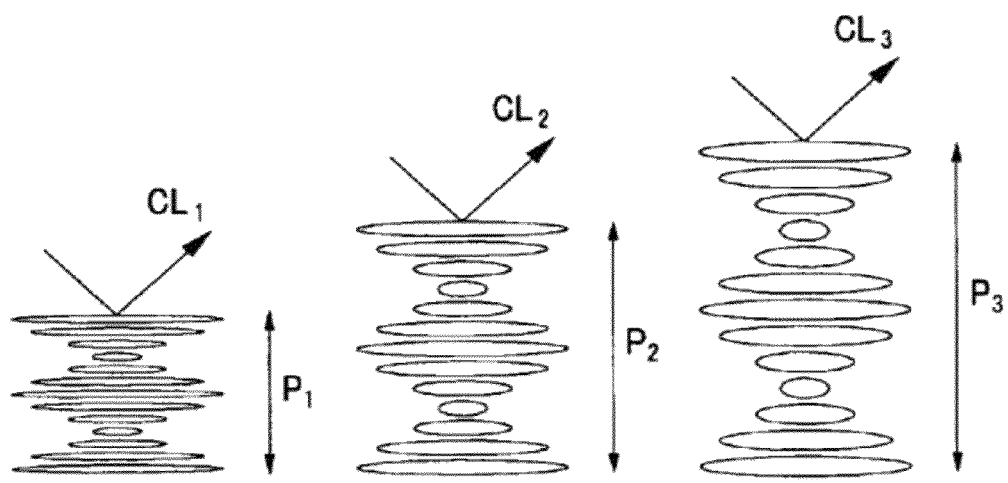
FIG. 2 is a schematic diagram showing reflection of light according to a pitch of liquid crystals.

FIG. 2 is a schematic diagram showing reflection of light according to a pitch of liquid crystals.

Referring to FIG. 2, a wavelength of reflected light varies according to the pitch of liquid crystals.

Light of a first wavelength region $CL_1$ may be reflected if the pitch of liquid crystals is $P_1$, light of a second wavelength region $CL_2$ may be reflected if the pitch of liquid crystals is $P_2$, and light of a third wavelength region $CL_3$ may be reflected if the pitch of liquid crystals is $P_3$. According to the above relational expression, the first wavelength region $CL_1$ may be a short-wavelength region, the third wavelength region $CL_3$ may be a long-wavelength region, and the second wavelength region $CL_2$ may be a wavelength region between the first and third wavelength regions $CL_1$ and $CL_3$. For example, the first wavelength region $CL_1$ may be a blue wavelength region, the second wavelength region $CL_2$ may be a green wavelength region, and the third wavelength region $CL_3$ may be a red wavelength region.

Therefore, in the LCD device including the red, green, and blue pixels R, G, and B, if a pitch of cholesteric liquid crystals included in the liquid crystal layer 50 of the red pixel R is adjusted to be the largest, the pitch of cholesteric liquid crystals included in the liquid crystal layer 50 of the blue pixel B is adjusted to be the smallest, and the pitch of cholesteric liquid crystals included in the liquid crystal layer 50 of the green pixel G is adjusted to be medium, a wavelength region of light reflected from the liquid crystal layer 50 may be selectively controlled.

The encapsulated mixture of the nematic liquid crystal compound and the photosensitive chiral additive may be fixed onto the substrate 10 by using a binder. The binder may be, for example, poly vinyl alcohol (PVA) or gelatin.

An upper orientation layer (not shown) is formed on the liquid crystal layer 50, and a light absorbing layer 60 is formed on the upper orientation layer. The light absorbing layer 60 may absorb light that is incident from an external environment.

A common electrode 70 is formed on the light absorbing layer 60. The common electrode 70 may be formed of a transparent conductor or an opaque conductor and may be formed over a whole surface of the substrate 10.

A method of manufacturing the LCD device illustrated in FIG. 1 will now be described with reference to FIGS. 3 through 8 together with FIG. 1.

FIGS. 3 through 8 are cross-sectional diagrams showing sequential processes of a method of manufacturing the LCD device illustrated in FIG. 1.

Figure 3:
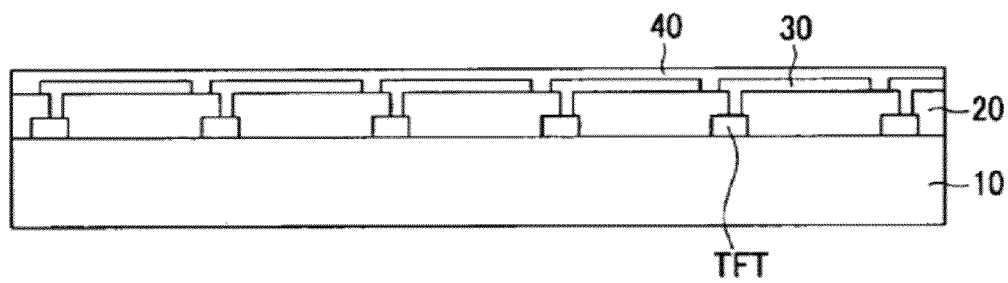
FIGS. 3 through 8 are cross-sectional diagrams showing sequential processes of a method of manufacturing the LCD device illustrated in FIG. 1.

Referring to FIG. 3, the TFTs, the insulating layer 20, the pixel electrodes 30, and the lower orientation layer 40 are sequentially formed on the substrate 10.

Figure 4:
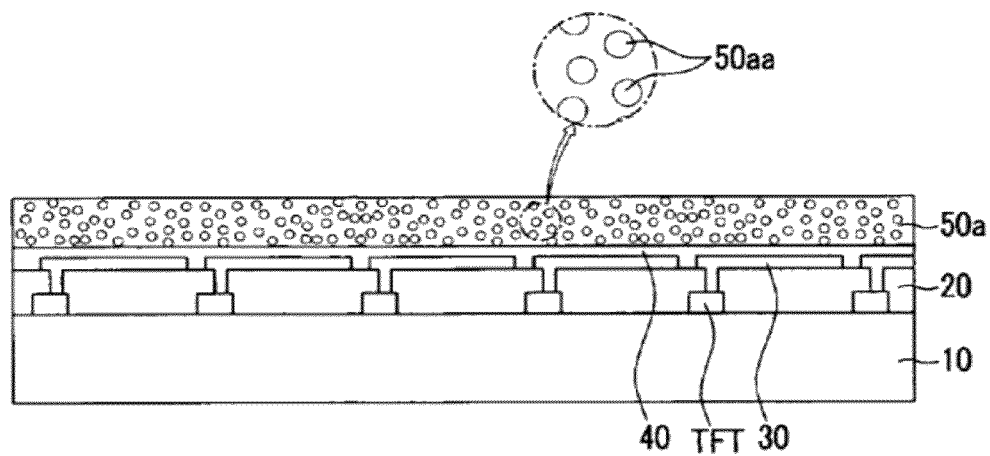

Then, referring to FIG. 4, a liquid crystal capsule layer 50a is coated on the lower orientation layer 40.

As the liquid crystal capsule layer 50a, a solution in which liquid crystal capsules 50aa including nematic liquid crystals and a photosensitive chiral additive are dispersed may be coated by using a solution process.

The liquid crystal capsules 50aa may be formed by using, for example, an emulsification method, a coacervation method, or a membrane separation method.

A case when the liquid crystal capsules 50aa are formed by using a membrane separation method will now be described with reference to FIGS. 5A and 5B.

Figure 5A:
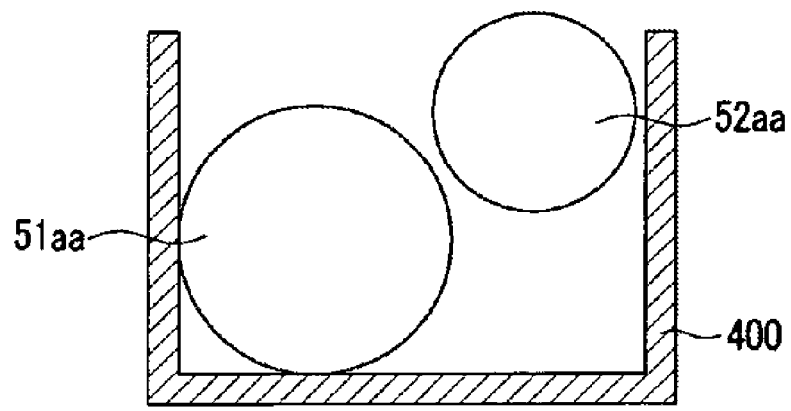

Referring to FIG. 5A, a nematic liquid crystal compound 51 as and a photosensitive chiral additive 52aa are put into a container 400.

Figure 5B:
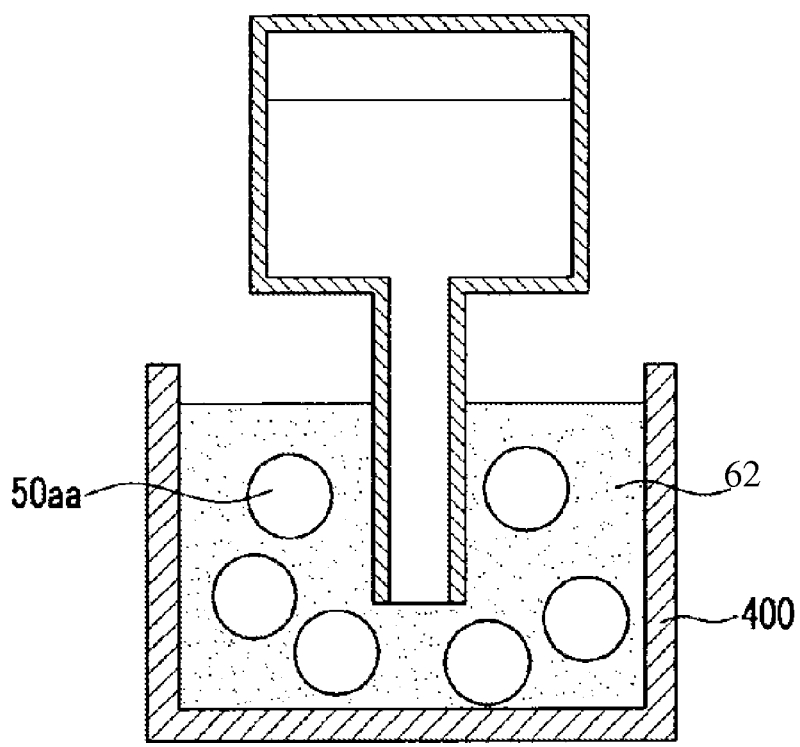

After that, referring to FIG. 5B, a mixture 50aa of the nematic liquid crystal compound 51aa and the photosensitive chiral additive 52aa is dispersed in an aqueous solution 62 including a water-soluble polymer. Here, the water-soluble polymer may be, for example, gelatin or gum arabic.

The mixture 50aa of the nematic liquid crystal compound 51 as and the photosensitive chiral additive 52aa is dispersed by using a membrane separation apparatus and then a pH adjuster is added such that the water-soluble polymer is condensed and adhered to the outside of droplets of the dispersed mixture 50aa of the nematic liquid crystal compound 51 as and the photosensitive chiral additive 52aa.

After that, a hardener is added to harden surfaces of the mixture 50aa of the nematic liquid crystal compound 51aa and the photosensitive chiral additive 52aa, thereby forming the liquid crystal capsules 50aa. Here, the hardener may be, for example, glutaraldehyde.

After that, the liquid crystal capsules 50aa are coated on the substrate 10 by using a method such as spin coating, slit coating, inkjet printing, knife coating, roll printing, offset printing, or gravure printing. In this case, the liquid crystal capsules 50aa may be fixed onto the substrate 10 by using a binder.

Figure 6:
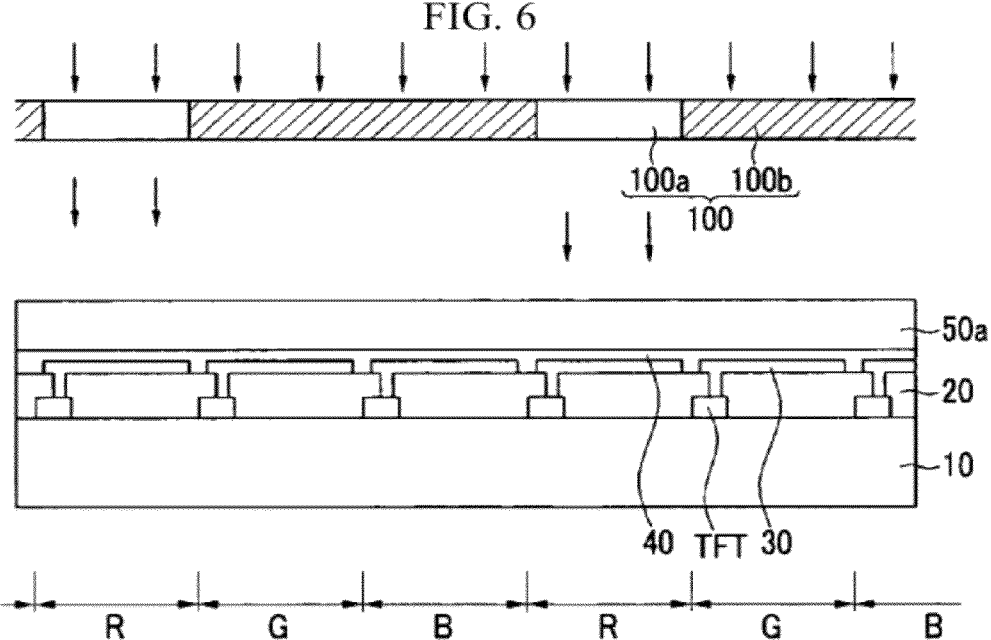

Then, referring to FIG. 6, a mask 100 is disposed on the liquid crystal capsule layer 50a. In this case, the mask 100 has a light-transmitting region 100a and a light-blocking region 100b and is disposed in such a way that the light-transmitting region 100a is located on the red pixel R.

After that, light having a first intensity is irradiated from above the mask 100. As such, light is irradiated onto only the red pixel R where the light-transmitting region 100a is located, only the liquid crystal capsule layer 50a of the red pixel R absorbs light, and thus a pitch of cholesteric liquid crystals is adjusted to reflect light of a red wavelength region.

Figure 7:
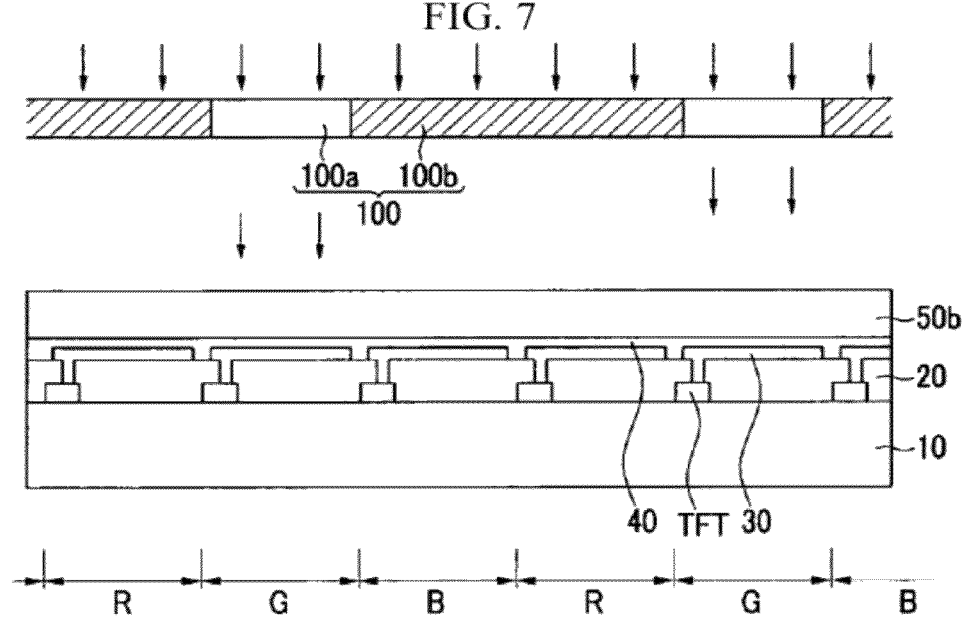

Then, referring to FIG. 7, the mask 100 is disposed on the liquid crystal capsule layer 50a in such a way that the light-transmitting region 100a of the mask 100 is located on the green pixel G.

After that, light having a second intensity less than the first intensity is irradiated from above the mask 100. As such, light is irradiated onto only the green pixel G where the light-transmitting region 100a is located, only the liquid crystal capsule layer 50a of the green pixel G absorbs light, and thus the pitch of cholesteric liquid crystals is adjusted to reflect light of a green wavelength region.

Figure 8:
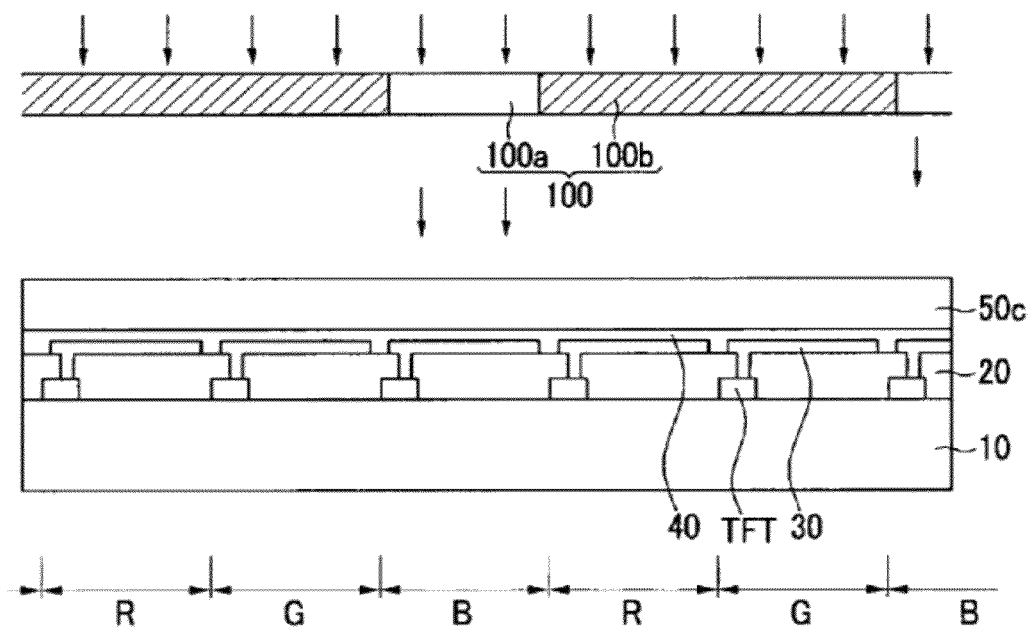

Then, referring to FIG. 8, the mask 100 is disposed on the liquid crystal capsule layer 50a in such a way that the light-transmitting region 100a of the mask 100 is located on the blue pixel B.

After that, light having a third intensity less than the second intensity is irradiated from above the mask 100. As such, light is irradiated onto only the blue pixel B where the light-transmitting region 100a is located, only the liquid crystal capsule layer 50a of the blue pixel B absorbs light, and thus the pitch of cholesteric liquid crystals is adjusted to reflect light of a blue wavelength region.

As such, the liquid crystal layer 50 may include cholesteric liquid crystals having different pitches between the red, green, and blue pixels R, G, and B. Therefore, without using color filters, light of red, green, and blue wavelength regions may be reflected from pixels and thus colors may be displayed.

Then, referring to FIG. 1, the light absorbing layer 60 is formed on the liquid crystal layer 50, and the common electrode 70 is formed on the light absorbing layer 60.

MODE OF THE INVENTION

Hereinafter, the present invention will be described in more detail by explaining embodiments of the invention. The following embodiments are provided for explanation and do not limit the scope of the invention.

Manufacturing of LCD Device

Embodiment 1

Nematic liquid crystals (E7 produced by Merck Ltd.) and 8 weight % of a photosensitive chiral additive (dianhydro-D-glucitol bis-(4-methoxy)cinnamate) are mixed and then are dispersed in a gelatin aqueous solution by using a membrane separation apparatus. After that, a 50% aqueous solution of a hardener (glutaraldehyde) is mixed and then a 1% aqueous solution of citric acid is dropped to adjust the pH level to 4.5, thereby hardening surfaces of liquid crystal capsules.

The hardened liquid crystal capsules are mixed with a 10% aqueous solution of PVA, thereby preparing a liquid crystal capsule solution.

The liquid crystal capsule solution is coated to 10 μm on a substrate on which pixel electrodes are formed, and then is dried, thereby forming a liquid crystal capsule layer. After that, a mask is disposed on the liquid crystal capsule layer in such a way that light is transmitted through only a first region from among first through third regions of the liquid crystal capsule layer, and 100 mJ of ultraviolet (UV) light having a wavelength of 365 nm is irradiated, thereby adjusting a pitch of the first region of the liquid crystal capsule layer. Likewise, the mask is disposed in such a way that light is transmitted through only the second region, and 120 mJ of UV light having a wavelength of 365 nm is irradiated, thereby adjusting a pitch of the second region of the liquid crystal capsule layer. Also, the mask is disposed in such a way that light is transmitted through only the third region, and 220 mJ of UV light having a wavelength of 365 nm is irradiated, thereby adjusting a pitch of the third region of the liquid crystal capsule layer.

An absorption layer and an electrode layer are sequentially formed on the liquid crystal capsule layer.

Embodiment 2

Except that 25 weight % of the photosensitive chiral additive is mixed and that 2000 mJ, 2600 mJ, and 4000 mJ of UV light are respectively irradiated onto the first through third regions from above the liquid crystal capsule layer, an LCD device is manufactured by using the same method used in Embodiment 1.

Embodiment 3

Cholesteric nematic liquid crystals that reflect light having a wavelength of 750 nm (CH100-750 produced by Slichem Ltd.; Δn=0.158) and 3.3 weight % of a photosensitive chiral additive (dianhydro-D-glucitol bis-(4-methoxy)cinnamate) are mixed, thereby preparing liquid crystal capsules.

Except that 67.5 mJ, 405 mJ, and 2430 mJ of UV light are respectively irradiated onto the first through third regions from above the liquid crystal capsule layer obtained by coating the liquid crystal capsules, an LCD device is manufactured by using the same method used in Embodiment 1.

Embodiment 4

Cholesteric nematic liquid crystals that reflect light having a wavelength of 750 nm (C16-008 produced by Slichem Ltd.; Δn=0.235) and 3.3 weight % of a photosensitive chiral additive (dianhydro-D-glucitol bis-(4-methoxy)cinnamate) are mixed, thereby preparing liquid crystal capsules.

Except that 67.5 mJ, 405 mJ, and 2430 mJ of UV light are respectively irradiated onto the first through third regions from above the liquid crystal capsule layer obtained by coating the liquid crystal capsules, an LCD device is manufactured by using the same method used in Embodiment 1.

Embodiment 5

After a plurality of TFTs are formed on a plastic substrate, an LCD device is manufactured by using the same method used in Embodiment 1.

Evaluation

A voltage is applied to the LCD device manufactured according to Embodiment 1 and colors displayed on the LCD device are checked.

Figure 9:
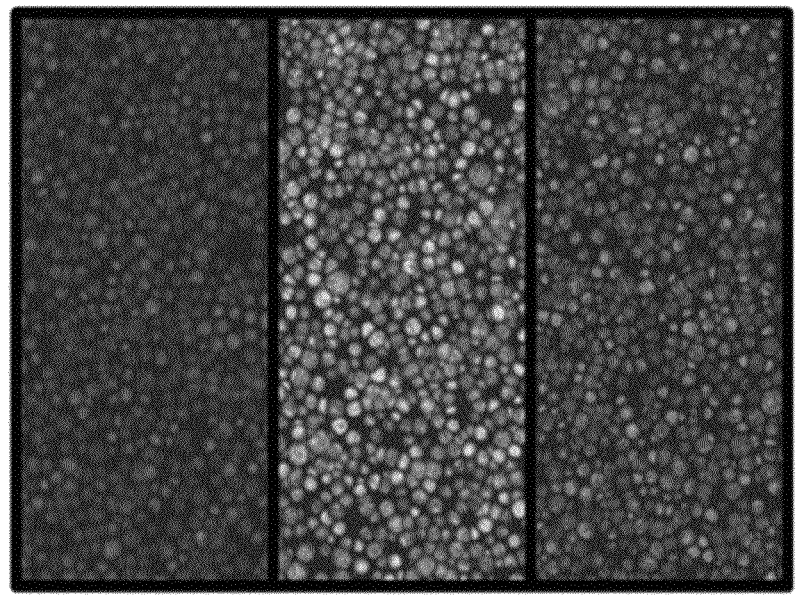
FIG. 9 is a photographic image showing colors displayed on an LCD device according to Embodiment 1.

FIG. 9 is a photographic image showing colors displayed on the LCD device according to Embodiment 1.

Referring to FIG. 9, it is shown that blue, green, and red may be respectively displayed on the first through third regions without using color filters.

Figure 10:
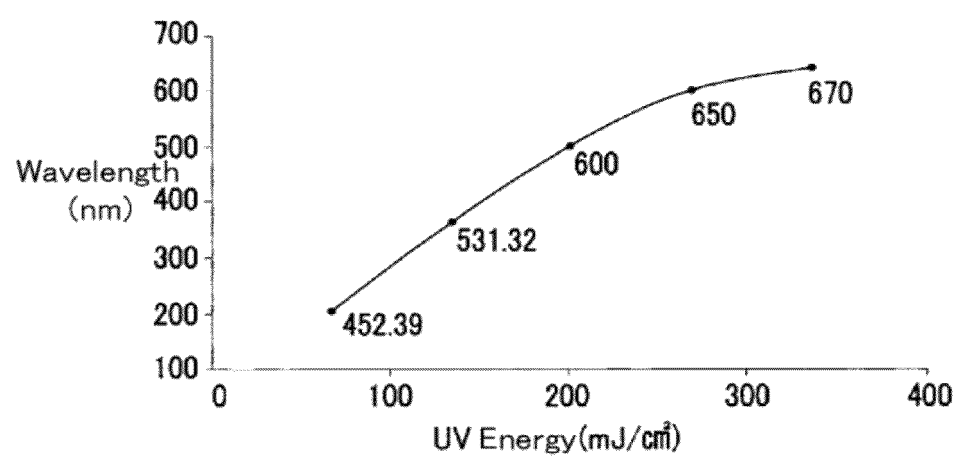
FIGS. 10 and 11 are graphs showing wavelength regions of reflected light based on the intensity of irradiated light in LCD devices according to Embodiments 1 and 2, respectively.
Figure 11:
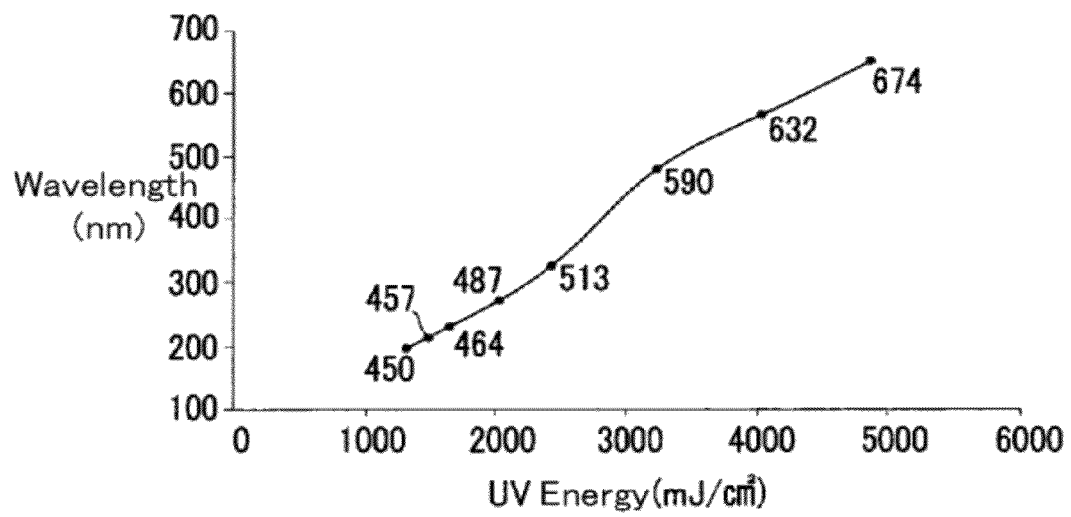

FIGS. 10 and 11 are graphs showing wavelength regions of reflected light based on the intensity of irradiated light in the LCD devices according to Embodiments 1 and 2, respectively.

Referring to FIGS. 10 and 11, it is shown that, in the LCD devices according to Embodiments 1 and 2, if the intensity of irradiated light is increased, a color having a long wavelength is displayed.

Figure 12:
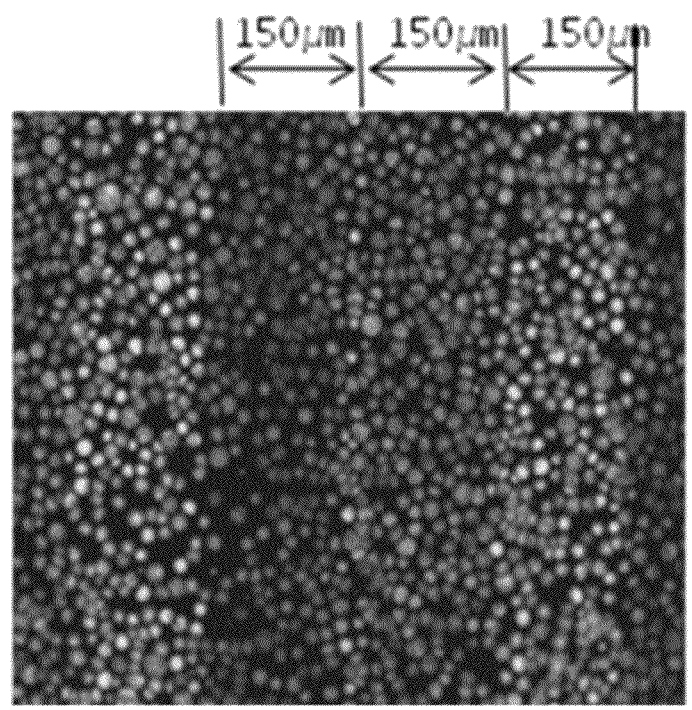
FIGS. 12 and 13 are photographic images showing colors displayed on LCD devices according to Embodiments 3 and 4.
Figure 13:
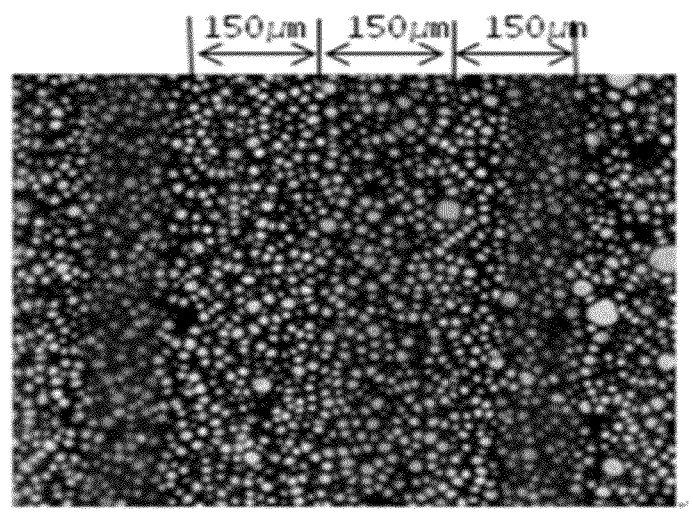

FIGS. 12 and 13 are photographic images showing colors displayed on the LCD devices according to Embodiments 3 and 4.

Referring to FIGS. 12 and 13, it is shown that, like the LCD device according to Embodiment 1, the LCD devices according to Embodiments 3 and 4 may display blue, green, and red respectively on the first through third regions without using color filters.

When FIGS. 12 and 13 are compared, it is shown that the LCD device according to Embodiment 4, which uses nematic liquid crystals having a higher refractive index, reflects light over a wider wavelength region and thus has a higher reflectance.

Figure 14:
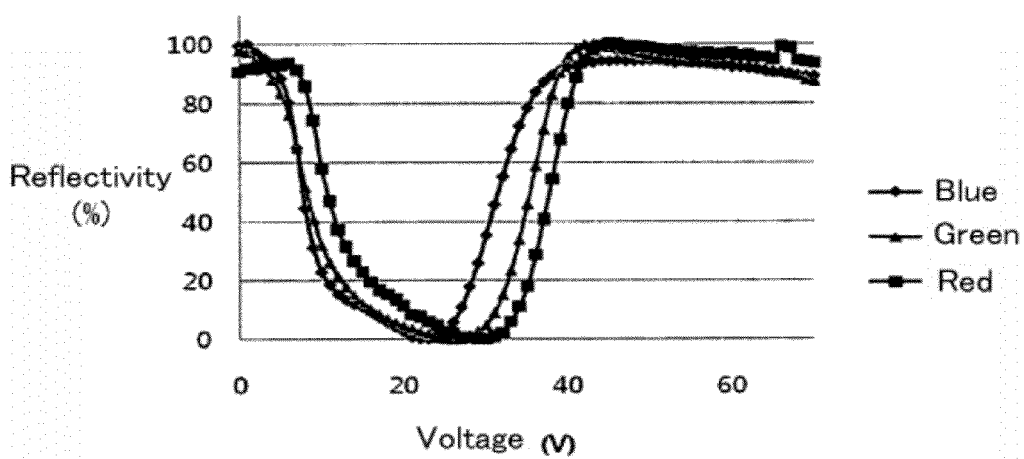
FIG. 14 is a graph showing voltage versus reflectivity characteristics of the LCD device according to Embodiment 4.

FIG. 14 is a graph showing voltage versus reflectivity characteristics of the LCD device according to Embodiment 4.

Referring to FIG. 14, it is shown that the LCD device according to Embodiment 4 may adjust the reflectance of each of blue, green, and red pixels from an absorption state to a reflection state by adjusting the size of an applied voltage.

Figure 15:
FIG. 15 is a photographic image of an LCD device according to Embodiment 5.

FIG. 15 is a photographic image of the LCD device according to Embodiment 5.

Referring to FIG. 15, it is shown that the LCD device according to Embodiment 5 may stably display colors and letters without image distortion even when the LCD device is bent While the present invention has been particularly shown and described with reference to exemplary embodiments thereof, it will be understood by one of ordinary skill in the art that various changes in form and details may be made therein without departing from the spirit and scope of the present invention as defined by the following claims.

The invention claimed is:

1. A method of manufacturing a liquid crystal display (LCD) device comprising first through third pixels for displaying different colors, the method comprising:
   forming a first electrode on a substrate;
   forming on the first electrode a liquid crystal layer comprising cholesteric liquid crystals formed by mixing a non-photosensitive liquid crystal compound and a photosensitive chiral additive;
   irradiating different intensities of light onto a first liquid crystal layer located on the first pixel, a second liquid crystal layer located on the second pixel, and a third liquid crystal layer located on the third pixel;
   forming a light absorbing layer on the liquid crystal layer; and
   forming a second electrode disposed on the light absorbing layer and facing the first electrode.

2. The method of claim 1, further comprising, before the liquid crystal layer is formed, encapsulating the cholesteric liquid crystals.

3. The method of claim 2, wherein the encapsulating of the cholesteric liquid crystals is performed by using an emulsification method, a coacervation method, or a membrane separation method.

4. The method of claim 2, wherein the encapsulating of the cholesteric liquid crystals comprises:
   preparing a solution by dispersing the non-photosensitive liquid crystal compound and the photosensitive chiral additive in a solvent; and
   adding a hardener into the solution.

5. The method of claim 2, further comprising, after the cholesteric liquid crystals are encapsulated, mixing the encapsulated cholesteric liquid crystals with a binder.

6. The method of claim 1, wherein the first pixel displays a color having a longer wavelength region than that of a color displayed by the second pixel, and
   wherein the second pixel displays a color having a longer wavelength region than that of a color displayed by the third pixel.

7. The method of claim 6, wherein the irradiating of different intensities of light onto the liquid crystal layer located on the first pixel, the liquid crystal layer located on the second pixel, and the liquid crystal layer located on the third pixel:
   is performed by using a mask having a light-transmitting region and a light-blocking region, and
   comprises:
      disposing the light-transmitting region of the mask on the first pixel and irradiating light having a first intensity;
      disposing the light-transmitting region of the mask on the second pixel and irradiating light having a second intensity; and
      disposing the light-transmitting region of the mask on the third pixel and irradiating light having a third intensity, and
   wherein the first intensity is greater than the second intensity and the second intensity is greater than the third intensity.

8. The method of claim 6, wherein the first through third pixels respectively display red, green, and blue.

9. The method of claim 1, wherein the photosensitive chiral additive comprises a photo-isomerizable chiral additive, a photo-polymerizable chiral additive, a photo-decomposable chiral additive, or a combination thereof.

10. The method of claim 1, further comprising forming a light absorbing layer on one surface of the liquid crystal layer.

* * * * *